Figure 1:
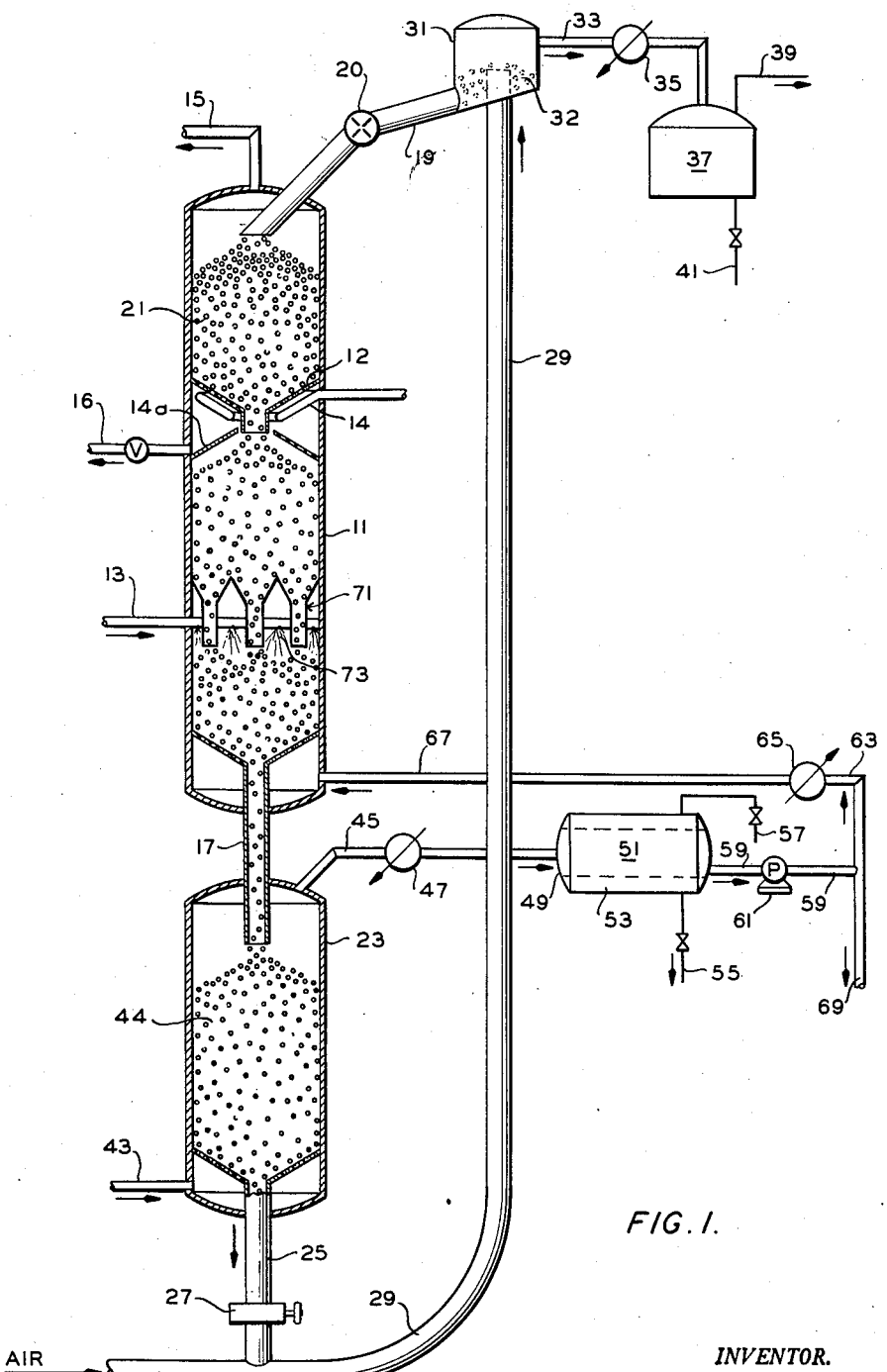

Sept. 22, 1959

R. A. FINDLAY 2,905,596

DISTILLATION METHOD AND APPARATUS

Filed Jan. 4, 1954

3 Sheets-Sheet 1

INVENTOR.
R. A. FINDLAY
BY Hudson & Young
ATTORNEYS

Sept. 22, 1959

R. A. FINDLAY 2,905,596

DISTILLATION METHOD AND APPARATUS

Filed Jan. 4, 1954

3 Sheets-Sheet 2

INVENTOR.
R. A. FINDLAY

BY *Harban W. Young*

ATTORNEYS

Sept. 22, 1959  R. A. FINDLAY  2,905,596
DISTILLATION METHOD AND APPARATUS
Filed Jan. 4, 1954  3 Sheets-Sheet 3

INVENTOR.
R. A. FINDLAY
BY Hudson & Young
ATTORNEYS

United States Patent Office 2,905,596
Patented Sept. 22, 1959

2,905,596
DISTILLATION METHOD AND APPARATUS

Robert A. Findlay, Bartlesville, Okla., assignor to Phillips Petroleum Company, a corporation of Delaware Application January 4, 1954, Serial No. 401,800

23 Claims. (Cl. 202—40)

This invention relates to distillation. In one aspect it relates to the operation of packed distillation columns. In another aspect it relates to the operation of distillation columns involving the use of downwardly moving nonadsorbent packing material.

It is well known that small diameter packed fractionators can be operated at relatively high efficiency at low or intermediate capacities in comparison to large scale bubble cap columns. However, when large diameter packed fractionators are used the advantages of packed columns disappear because of maldistribution (channeling) of liquid and vapor.

An object of my invention is to eliminate channeling in large diameter packed columns.

Another object of my invention is to provide a method for operating a packed column of commercial size to avoid channeling.

Still another object of my invention is to provide a method for operating a commercial size packed column wherein the pressure drop through the column is small.

Yet another object of my invention is to provide a relatively inexpensive method for operating commercial size packed columns.

Still another object of my invention is to provide a method for efficiently operating a packed column of commercial size.

Still other objects and advantages of my invention will be obvious to those skilled in the art upon reading the following specification and drawing which respectively describes and illustrates preferred embodiments of my invention.

I have found that when an easily flowing packing material is passed downwardly through a fractionation column liquid and vapor channeling can be substantially eliminated. According to my invention I introduce feed material to be fractionated at substantially its boiling point and in a finely divided liquid and/or vaporous condition at a level about midway vertically of the treating zone. The liquid portion of the feed passes downward on the surface of the packing material through the stripping zone while vapor of the feed flows upward through the fractionation zone. Packing material is introduced into the top of the column at a temperature sufficiently low to provide all necessary refluxing. A portion of the bottoms product recovered from the surface of the packing material at the bottom of the column is returned in vaporous form to furnish reboiling heat while the remainder is removed as product. A packed fractionating column can be operated according to my invention at a pressure greater than atmospheric or at a subatmospheric pressure, i.e. under vacuum conditions. With the introduction of cool packing material to provide reflux at the top of the column, the use of a reflux condenser is unnecessary but the overhead material must be condensed and then is passed directly to subsequent use or storage, as desired.

The packing material according to my invention is of relatively light weight and is easily lifted in a gas lift, or a liquid lift apparatus, as, for example, by a moving stream of easily vaporized liquid hydrocarbon such as propane, butane, or pentane.

The packing can obviously be elevated by mechanical elevators, such as bucket elevators or screw-type elevators. When liquids are used for lifting purposes the liquid is separated from the packing material and the residual liquid evaporated therefrom prior to introduction of the packing material into the column. During the removal of the lifting medium from the packing material sufficient evaporation is intended to occur to cool the packing material to such a temperature as desired for refluxing the top of the column. When air is used for lifting the packing material to the air should be sufficiently cool to cool the packing prior to its introduction into the column.

As mentioned above the operation of a packed fractionator column according to my invention can be at a superatmospheric or at a subatmospheric pressure, as desired. When operating at a subatmospheric pressure it is advantageous to use an internal mechanical elevator operated by a motor, all of which is disposed within the column. In this manner the packing material does not come in contact with air in an air-lift or liquid in a liquid-lift and maintenance of vacuum condition is simplified. When using an internal elevator I operate my process at pressures sufficiently low or under a vacuum sufficiently high to come within the range of "short path" or "molecular distillation." When operating a distillation column under "short path" or "molecular distillation" conditions the pressures are maintained sufficiently low so that the mean free path of the molecules is sufficiently long that the molecules travel from a point of ejection in the liquid film to a point of condensation.

Molecular distillation is considered to consist of heating a liquid in the form of a thin film or layer which has in close proximity to the surface of said liquid a condensing surface and maintaining the intervening space evacuated to such a degree that the mean free path of the evaporating molecules is greater than the distance between the surface of the evaporating liquid and the condenser surface. The absolute pressure necessary to make the mean free path of the molecules being distilled of sufficient magnitude to be useful in this type of distillation is of the order of $1 \times 10^{-3}$ to $1 \times 10^{-4}$ mm. of mercury, and the method of my invention is intended to include such pressures.

The packing material useful in the process of my invention is rigid material, preferably hollow metal shapes. It is preferable to use such packing material since it can be handled easily and with a minimum of breakage. Hollow metal spheres are used for ease of lifting or elevating and to balance the heat requirements in the top of the column with the heat-carrying capacity of the packing. The packing spheres should be sufficiently smooth to prevent adsorption of material being distilled yet may, if desired, be slightly roughened in order to retain relatively large amounts of liquid on their surfaces. Control of the process is obtained by regulation of the packing flow rate, of the temperature of the packing added to the top of the column, and of the temperature of the vaporous reboiling material introduced to the bottom of the column and by the feed rate, its composition and temperature.

The metal packing material or balls are preferably made of such a metallic material as iron, aluminum, magnesium or such a material as stainless steel. Ceramic material may, although less preferably, be used as the packing e.g. for those applications where corrosion of metals is encountered. I find that metals such as aluminum and magnesium are ideally fitted for my packing material. The heat capacity and the heat conductivity of these metals are satisfactory for furnishing reflux cooling to the column.

Referring now to the drawing and specifically to Figure 1, reference numeral 11 identifies a fractionating tower. Feed line 13 is for introduction of material to be distilled. A line 15 is provided at the top of the tower for removal of overhead product while a pipe 17 at the bottom is for removal of solid packing material with adhering liquid. The column is packed with rigid hollow metal balls 21. Connected with the feed pipe 13 is a feed introduction device, which, for exemplary purposes consists of a spray ring 73. A solid material flow tube assembly 71 is provided, as shown, for forming a space into which the feed material may be sprayed upon the downflowing metal balls. The pipe 17 at the bottom of the vessel communicates therefrom with a stripping vessel 23. A pipe 43 admits stripping steam into the lower portion of vessel 23. A pipe 45 is for passage of the stripping steam and stripped vapors from vessel 23 to a condenser 47. Condensate from condenser 47 passes into a phase separator vessel 49. In this vessel condensate is separated into a water layer 53 and a product layer 51. A pipe 57 is provided for venting purposes. A drain line 55 is provided, as shown, for removal of the water layer when necessary. A pipe 59 leads from the product phase of tank 49 to a pump 61. Material pumped through pump 61 is divided into two parts, one part passing through a pipe 63, a vaporizer 65 and vaporized material is passed on through a pipe 67 into the lower portion of vessel 11. Material recirculated in this manner to the bottom of vessel 11 serves to furnish stripping vapors and reboiling heat. Bottoms product is removed through a pipe 69 to such disposal as desired.

A pipe 25 leads from the lower portion of vessel 23 to a packing material lift pipe 29. A valve 27 is provided in conjunction with pipe 25 for regulating the rate of flow of solid material therethrough. Air or other gas is introduced into pipe 29, as indicated, for lifting the packing material from the outlet end of pipe 25 to a separator vessel 31. In this vessel 31 the solid packing material is separated from the air or other gas which is removed from vessel 31 through a pipe 33 containing a condenser 35. Any condensed material and uncondensed gases pass from condenser 35 to a tank 37. Fixed gases can leave tank 37 through a pipe 39 for such disposal, as desired, while liquid condensate is removed through a drain pipe 41 to such disposal as desired. Packing material passes from separator 31 via pipe 19 and a flow control apparatus 20, such as a star valve, into vessel 11.

In the operation of the embodiment of apparatus illustrated in Figure 1, a feed material comprising, for example, a hydrocarbon feed stock to be fractionally distilled is passed through pipe 13 and is sprayed at about its boiling point through spray ring 73 into the column 11. This spray introduction of feed material into vessel 11 is intended to add the feed in the form of finally divided droplets of liquid, and/or vapor. The feed introduced as liquid is not added sufficiently fast that it will flow downward at a rate faster than the rate of downward movement of the packing. It is intended that just enough liquid is added to wet the surface of the spherical packing members. Vapors rising up the column contact, for example, a certain ball, and some constituents condense in the liquid film on this ball and an equivalent amount of lower boiling material vaporizes therefrom and flows upward in the column. Vapor flows upward in the portion of the column below the feed level in the same manner as stripping gases flow upward in that portion of a conventional bubble cap column. The upper portion of my column 11 is similar in that fractionation takes place therein. To provide cooling for the top of the column I merely cool the solid packing material and I then add this cool packing material to the column. The cooled packing material forms a sort of dry reflux in that no extraneous liquid is added at this point. The degree of cooling of the packing material, i.e., its temperature when introduced into the column, controls the end point of the material removed through line 15. The cool packing material tends to condense the higher boiling portion of the vapors in the top of the column, and at all points below the point of first condensation and the feed level of the column fractionation occurs.

If it is desired to remove an intermediate product from the column a condenser 14 may be provided as illustrated for condensing vaporous material at any given level in the upper or fractionation portion of the column. A drain plate 14a gathers the condensed material dripping from condenser 14 and this material is removed from the column through a sidedraw 16. A perforate baffle plate 12 is disposed immediately above condenser 14 so that the downflowing packing will not come in contact with the condenser.

Solid packing material is removed from the bottom of the column through pipe 17 and is conducted into the stripping vessel 23. Superheated steam is introduced into this column through pipe 43 and rises upward through the bed 44 of a packing material and strips therefrom the film or thin layer of bottoms product. The mixture of steam and vaporous bottoms product leaves vessel 23 through pipe 45 and is passed through condenser 47. The condensate passes on to the phase separator tank 49. A water layer 53 settles to the bottom of tank 49 and can be withdrawn through a water draw line 55 while a product phase, for example, a hydrocarbon phase 51, floats upon the water and is removed through line 59 under the influence of pump 61. The stream issuing from pump 61 is divided into two portions, one portion being passed through the line 63, vaporized in heater 65 and vapors passed on through line 67 into the bottom of the main vessel 11 for reboiling and stripping purposes. Vapors pass upward through this lower stripping section and strip the lower boiling components from the liquid material adhering to the downwardly flowing packing. The other portion of the fluid issuing from the pump 61 is passed through pipe 69 as the bottoms product of the process to subsequent storage or disposal, as desired.

The hot stripped packing material is withdrawn from vessel 23 by way of pipe 25 containing the solid material flow control valve 27. By an adjustment of this valve the rate of withdrawal of packing material from vessel 23 is regulated. The solid packing material passing valve 27 drops into pipe 29 and is lifted in an air lift or gas lift operation up pipe 29 to vessel 31. Since this vessel has a larger diameter than that of pipe 29 the packing material drops to the bottom and ultimately flows through pipe 19 under the influence of the flow control valve 20. The air or other gas used for packing lifting purposes leaves tank 31 through pipe 33 and flows through condenser 35 in which any liquid material therein is condensed. Condensate and uncondensed gases enter tank 37 for phase separation, liquid condensate being withdrawn through the draw line 41 while the uncondensed gases pass through line 39.

Vent pipe 57 is provided in the phase separator tank 49 for pressure relief or other purpose as desired.

As an example of the operation of the embodiment of my invention, as illustrated in Figure 1 1-inch outside diameter thin walled hollow aluminum spheres are circulated at a rate of about 1,000,000 to 3,000,000 per hour through a column corresponding to column 11. A 50–50 weight percent mixture of a methylcyclohexane-n-heptane feed stock is fed into said column through an inlet pipe corresponding to pipe 13. Superheated steam is introduced into a stripper corresponding to vessel 23 to remove bottoms material from the spheres. Hydrocarbon and steam are condensed and condensate separated in a separator, as vessel 49. Water is removed from the bottom of this separator while hydrocarbon liquid is withdrawn, a portion being removed from the system, i.e., 50 pounds per hour of 90 weight percent methylcyclohexane, as bottoms product, while the remainder is vaporized at 214° to 220° F. and the vapors introduced into the column as stripping agent.

From the vessel 23, the spheres are dropped into a lift pipe corresponding to pipe 29 into the bottom end of which liquid pentane is sprayed at a temperature of about 110° to 125° F. and at a pressure of 5 to 10 p.s.i.g. (pounds per square inch gage). The spheres, elevated by the pentane in pipe 29, are separated therefrom in a vessel corresponding to vessel 31. The pentane is vaporized from the spheres in pipe 29 and vessel 31 to cool the spheres, the vapor being withdrawn and condensed at about 970° F. preparatory to reuse as the sphere lifting agent.

Spheres are introduced into the main vessel at the above mentioned rate at a temperature of about 125° to 150° F. at about atmospheric or very slightly above atmospheric pressure. The spheres are intended to be introduced into said vessel 11 at such a temperature that vapor condenses on the spheres to produce an internal reflux. It is further intended to produce by this condensation a layer of liquid from 0.01 to 0.03 inch thick on the surface of the spheres. Such a layer of liquid of course easily wets the sphere surface but does not flow off. The temperature in the vapor space above the spheres is about 209° to 215° F. and sufficient vapor is removed from this space to yield, after condensation, about 50 pounds per hour of a liquid product containing about 90 weight percent of n-heptane.

For flexibility, and under some conditions, it is desirable to use pentane vapor in the sphere lift in addition to the sprayed pentane liquid and to add pentane liquid for supplemental sphere cooling at the top of the lift, as in vessel 31. The control of the rate of flow of the spheres will have considerable effect on the purity of the products because increasing the rate, at a given temperature, will cause more condensation and thereby increase the reflux ratio and will make for thinner liquid films on the spheres thereby increasing the surface of the liquid per unit of weight for vapor contacting. Movement of the spheres downwardly carries the liquid wetting their surfaces in a "rod-like" manner of flow with no channeling. The thin layer of liquid contributes to higher efficient mass transfer and to obtaining more than one theoretical stage per foot of column height in comparison to ½ to ¼ stage per foot of column height in a bubble cap column. The residual liquid remaining on the spheres at the bottom of the column is removed by steam stripping in a column similar to column 23 of Figure 1. The stripped spheres pass from the bottom of the stripping column through a control valve and are carried upward by and simultaneously chilled by pentane, as mentioned above. In other applications butane or propane, or other easily vaporized hydrocarbon could however, be used in place of the pentane as herein illustrated.

This embodiment of my invention is applicable to the distillation of various hydrocarbon mixtures, mixtures of other organic compounds, and in general, to any distillation process in which a conventional packed column may be employed. For certain applications, the embodiments to be described hereinafter are preferred. Thus, in the vacuum distillation of thermally unstable organic compounds, or of those compounds which tend to polymerize when heated to their normal boiling points, the apparatus of Figure 3 can be used.

Specific examples of feed stocks which can be processed by my invention include crude oils, naphtha fractions, aromatic hydrocarbon containing fractions including benzene, toluene, xylenes, etc., aliphatic mercaptans, disulfides and polysulfides, pyridine derivatives such as methylethylpyridine and methylvinylpyridine, etc. The apparatus can also be used in making separations between n-butane and isobutane, between n-pentane and isopentane, between cyclopentane and $C_6$ paraffin hydrocarbons, between diisopropyl and $C_6$ paraffin hydrocarbons, and between cyclohexane and associated hydrocarbons, and the like.

In place of the thin walled metal spheres, metal rings (open end cylinders) or spheres with several openings in their walls can be used. The use of such rings or spheres containing openings substantially doubles the liquid carrying capacity in such an operation.

Figure 2:
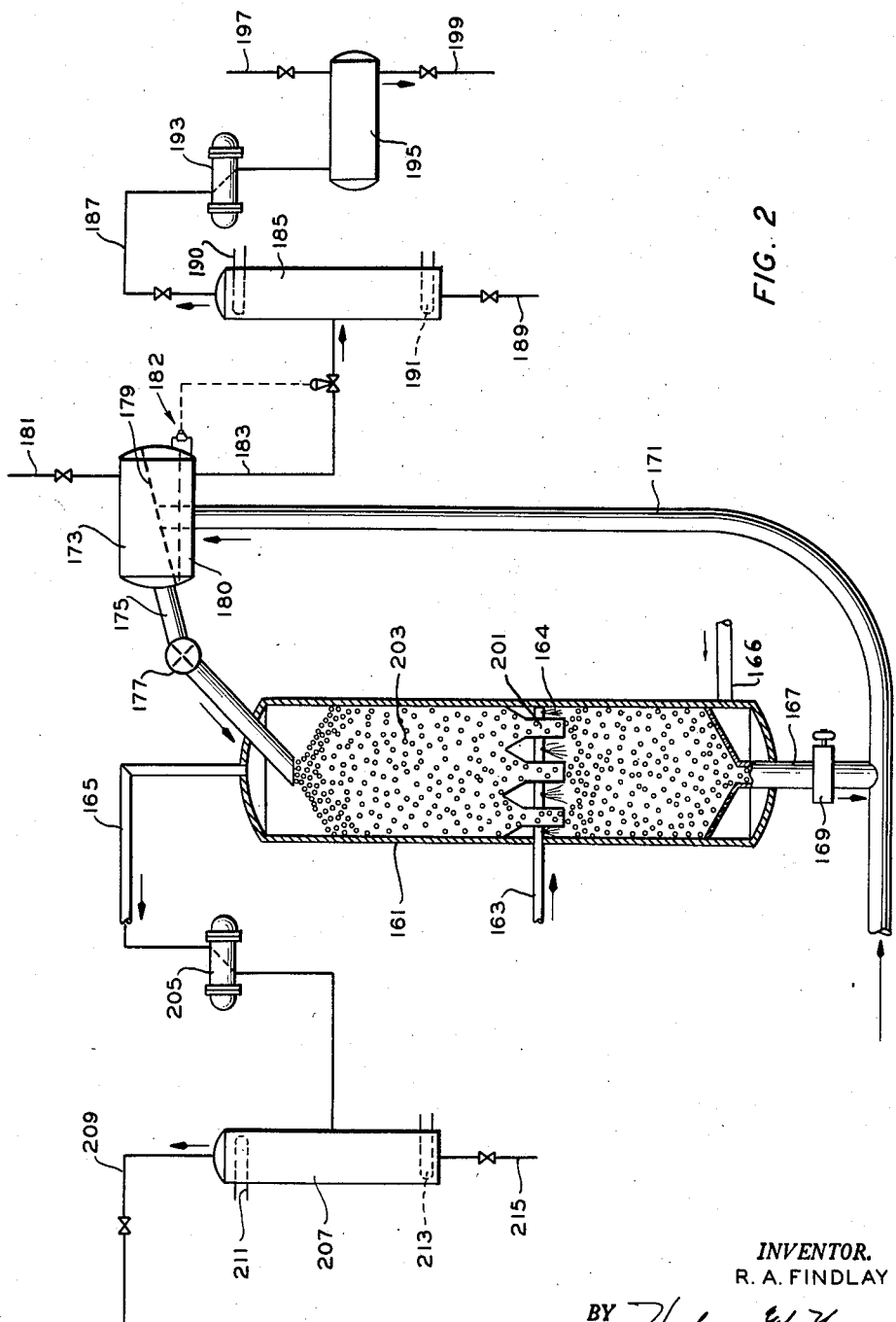

In Figure 2 of the drawing a fractionating column 161, more or less similar to column 11 of Figure 1, is provided. Metal spheres 203 or other suitable packing material according to my invention is introduced into the column through a pipe 175 and the flow therein is controlled by a solid material flow control valve 177. The downflowing packing material flows through the packing material flow tubes 201 and feed stock to be distilled is introduced at about its boiling point through a feed line 163 and sprayed through a spray ring 164 into the space surrounding the flow tubes 201. The fractionation operation taking place in vessel 161 is substantially the same as that described in relation to vessel 11 of Figure 1. Solid packing material containing adhering bottoms product is removed from vessel 161 through a pipe 167 and the flow therein is regulated by a solid material flow control valve 169. A pipe 166 is provided, as shown, for introduction of hot vapors for reboiling purposes. Such vapors can be produced by vaporizing a portion of the kettle product, as subsequently disclosed, from a bottoms product withdrawal line 189. The solid material passing through the flow control valve 169 enters the elevator pipe 171 and is carried upward therein by a stream of liquid, for example, propane, butane or pentane. When the metal ball packing material is made of aluminum or magnesium and the walls are about 1/16" thick the balls will float on the surface of such a liquid hydrocarbon. When such liquid hydrocarbons are used as the elevating media elevation of the packing materials is greatly simplified. The velocity of the liquid hydrocarbon carrying medium need not be great and in fact it is merely necessary to have a sufficient volume of liquid flowing to carry the balls. This type of transport does not depend on velocity since the above mentioned metal balls easily float on such liquids.

The stream of liquid hydrocarbon and its load of solid packing material issues from the upper end of pipe 171 into the upper section of a separation vessel 173. The separation vessel is provided with a perforate plate 179 arranged as illustrated. It is intended that the liquid carrying medium pass through the perforations in plate 179 and a certain liquid level of this liquid is maintained in this separation vessel.

In this operation a steam stripping vessel similar to vessel 23 of Figure 1 need not be used when the bottoms product of the process is soluble in the liquid hydrocarbon used for elevating the packing material. Upon contact of the solid packing material with the liquid hydrocarbon in pipe 171 the surface layer of liquid is immediately dissolved from the metal balls and it is actually the solution of bottoms product in liquid hydrocarbon which issues from the upper end of pipe 171. This solution settles to the bottom of vessel 173 and as mentioned above, a certain liquid level is carried therein. A float controlled valve apparatus 182 maintains the liquid 180 at any desired depth. This float controlled valve apparatus feeds this solution of light hydrocarbon and bottoms product into a fractionation vessel 185 in which the light hydrocarbon is distilled and passed overhead through an overhead line 187. This overhead material is condensed in a condenser 193 and condensate is passed into an accumulator 195. A pipe 197 is provided for venting purposes while a pipe 199 is for removal of the solid material elevating liquid. The fractionator 185 is provided with a reboiler coil 191 and a bottoms product withdrawal line 189. The bottoms product is removed through this line and conducted to any storage or disposal, as desired.

In usual operations the light hydrocarbon condensate is passed from accumulator 195, which serves as a surge tank, through pipe 199 directly into pipe 171 as the solid packing material lifting medium.

The packing material separating tank 173 is provided with a valved vent pipe 181. Solid material from this tank 173 flows through pipe 175 through a star or other suitable type of solid material flow control valve 177 into the fractionator 161. When such a hydrocarbon lifting liquid as propane, butane or pentane, is used it is intended that the evaporation of this light hydrocarbon from the surface of the metal balls cool the balls to such a degree as desired for providing reflux in the top of column 161. That is, the metal balls are cooled by evaporation and the cooled balls when introduced into the top of the fractionator 161 serves to provide refluxing without the addition of liquid to the column.

Depending upon the temperature conditions maintained in vessel 173 the light hydrocarbon may or may not be entirely evaporated from the surface of the packing material. When some liquid remains on the packing material and this wet packing material is introduced into the top of fractionator 161 this hydrocarbon will be vaporized and removed with the overhead product from this fractionator. This combined material flows through an overhead pipe 165, is condensed in a condenser 205 and condensate is introduced into a fractionator 207 for separation of this $C_3$, $C_4$, or $C_5$ hydrocarbon from the overhead product. This column 207 is provided with a reflux coil 211, a reboiler coil 213, an overhead vapor line 209 and a bottoms withdrawal line 215. In this fractionator 207 the light hydrocarbon will ordinarily be removed as overhead product while the main overhead product of the operation, that is, the overhead product of still 161 will be removed through line 215.

An important advantage of the embodiment of Figure 2 of my invention is the elimination of the steam stripping step. In place of the steam stripping for removal of the bottoms product from the packing material the product is removed by solution in the light hydrocarbon lifting medium and the product separated in a fractional distillation step.

Figure 3:
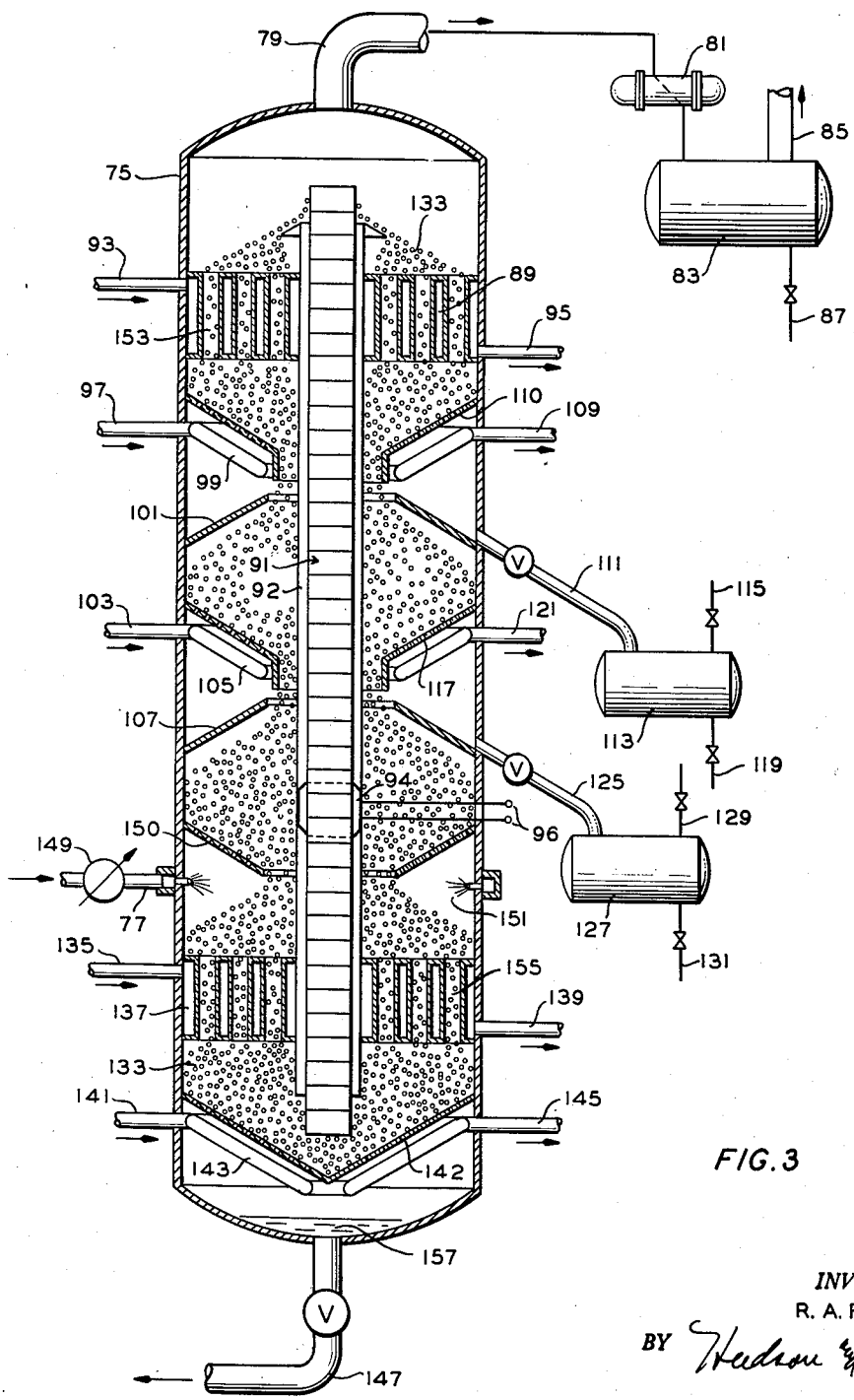

In the embodiment of my invention illustrated in Figure 3 of the drawing this apparatus is designed for carrying out an analogous fractional distillation operation under subatmospheric pressure conditions. On referring to Figure 3 an elongated cylindrical vessel 75 serves as the fractionating column. This column is provided, at a level near its bottom, with a heating element 137 and, at a level near its top, with a cooling element 89, as illustrated. The cooling element 89 is provided with vertical passages 153 through which solid packing material passes. In like manner the heating element 137 is provided with passages 155 for flow of solid packing material. At a point between heating element 137 and the bottom of the column is disposed a condenser 143, as illustrated. A pipe 141 is for passage of coolant into the condenser 143 and pipe 145 is for the outflow of coolant. A pipe 93 is provided for cooling medium to enter cooler 89 while a pipe 95 is for the outflow of coolant.

A feed line 77 enters the vessel 75 at a level somewhat below the midpoint vertically of the vessel. A spray ring 151 is provided as shown for spray feeding of the feed stock. Immediately above the spray ring 151 is a shield 150 for deflecting movement of the solid packing material for feed spraying purposes.

At a level slightly below the cooler 89 is provided a condenser and side product withdrawal assembly. A shield 110 is provided, as illustrated, and under this shield is disposed a condenser 99. A pipe 97 is intended to lead coolant into the condenser 99 and a pipe 109 is for its withdrawal. A drain plate 101 is provided under condenser 99 for collecting condensate dripping from the condenser. This drain plate connects with a valved pipe 111 and product collecting on the plate flows through this pipe into a product accumulator tank 113. This accumulator tank 113 is provided with a product removal line 119 and a pipe 115 leading to a vacuum producing apparatus, if desired.

If it is desired to make a second side product in this distillation operation a second side product producing and withdrawal apparatus is illustrated. This apparatus consists of a solid packing material deflecting shield 117 disposed as illustrated. Immediately below this shield is a condenser 105 into which coolant is passed through a line 103 and from which coolant is passed through a line 121. A drain plate 107 is disposed immediately below the condenser 105 for collection of condensate dripping therefrom. This drain plate connects with a valved product line 125 which conducts product to an accumulator tank 127. This tank is provided with a product withdrawal line 131 and a valved pipe 129 leading to a source of vacuum, if desired.

Feed pipe 77 is provided with a heater 149 for heating of the feed material to its boiling point prior to its introduction into the fractionator.

An overhead pipe 79 of relatively large diameter is provided as shown and this pipe leads to a condenser 81. The condensate discharges into a tank 83 which is provided with a valved drain line 87 and a pipe 85 of relatively large diameter. This latter pipe leads to the vacuum producing apparatus, not shown.

In the bottom of the column 75 is provided a drain line 147 for withdrawal of bottom product from the vessel, liquid 157 illustrating a lake of bottoms product within the vessel.

Disposed in the center of the vessel is an elevator assembly 91 for elevating the solid packing material from the bottom of the vessel to the top. The solid material throughout the extent of this vessel is identified by reference numeral 133. The elevator assembly 91 is preferably housed within the conduit 92. The elevator itself extends below the bottom of conduit 92 and into the body of solid packing material a sufficient distance that the elevator can pick up its load of solid material for elevation. The solid packing material is retained on a perforate conical plate 142. In like manner the top of the elevator extends at least a short distance above the top of the conduit 92 so that the packing material may be discharged into the space above the cooler 89.

For providing reflux to this column a coolant is flowed through the cooler 89 so that the solid material flowing downwardly through tubes 153 will be cooled to the degree required for providing the reflux.

At the bottom of the column solid packing material flows through tubes 155 of the heater 137 and while in these tubes the packing material will be heated to vaporize the film of liquid material. During this heating and vaporizing operation some of the vaporized material will flow upward in the column while some will flow downward in the direction of flow of the solid packing material. The portion of vapor which flows downward with the packing material passes through the perforate plate 142 and is condensed by the condenser 143 and the condensed liquid drains from the condenser into the bottom of the vessel 75 to form the lake of liquid 157. This liquid is of course the bottoms product of the operation. The film of liquid vaporized within tubes 155 and flowing upward passes at least to the next higher piece of packing and there some of the vapor enters the film of liquid. From this same piece of packing other and lower boiling molecules are vaporized and at least some pass upward to be condensed on a still higher piece of packing material. The condensation of vapor of a given boiling point in the liquid film supplies heat for vaporization of lower boiling material from the film. The vacuum pump system attached to pipe 85 tends to draw the vapor in an upward direction in the vessel while the downflowing solid packing material carries liquid downward in the vessel in a manner countercurrent to the direction of flow of vapors.

If it is desired to make one or more products condensing mediums can be passed through the condensers 99 and 105 to produce the equivalent of an overhead product from condenser 99 and an intermediate product from condenser 105.

This subatmospheric distillation operation may be carried out at sufficiently low pressures to approach the conventional "short path" or as it is sometimes called "molecular distillation." By short path or molecular distillation is meant distillation of a feed stock at an absolute pressure of about $1 \times 10^{-3}$ to $1 \times 10^{-4}$ mm. of mercury. Absolute pressures of this magnitude increase the mean free path of evaporating molecules to such an extent that they can leave an evaporating surface and pass to a relatively close condensing surface. By a mean free path sufficiently great for the molecule to pass from an evaporating surface to a condensing surface is meant such distance as for example ¼ inch, to 6, 8, or even 10 inches. When the residual gas pressure is about $3 \times 10^{-2}$ millimeters of mercury the mean free path of molecules is sufficiently great that a condenser placed at a distance of about 1 inch from the evaporating surface will collect distillate. When the gas pressure is about $8 \times 10^{-2}$ mm. of mercury the condensing surface should be placed about ¼ inch from the evaporating surface while at a pressure of about $3 \times 10^{-3}$ mm. the condensing surface can be as far as 10 inches from the evaporating surface. With pressure and distance related in this manner no real lower limit to the pressure or upper limit to the distance can be set but for operating convenience it is generally preferred not to operate at a residual gas pressure more than $1 \times 10^{-2}$ mm. of mercury so that the condensing surface can be placed at a reasonable distance from the evaporating surface. Pressures greater than ⅒ mm. of mercury do not give a mean free path sufficient to separate the distillate without contamination. Pressures below .01 mm. such as between .001 mm. and .00001 mm. of mercury are preferred.

An internally disposed motor 94 is provided to supply motive power to the elevator apparatus 91. To supply electric current to the motor 94 lead wires 96 conduct electricity from a source, not shown, through the walls of the vessel 75. The lead wires of course should be well insulated in a gas tight manner from the walls of the vessel. By employing an internally disposed motor and elevator system this apparatus can be operated at reasonably low absolute pressures.

Feed material to be fractionally distilled according to the process of my invention and in the apparatus, as illustrated, may be most any feed stock desired to be fractionated. Many stocks which decompose, polymerize, or become chemically reactive at temperatures used in conventional atmospheric or superatmospheric distillation conditions, can be fractionated in the apparatus illustrated in Figure 3 under vacuum conditions. The embodiments of apparatus of Figures 1 and 2 are in general applicable to the fractionation of feed stocks at more or less conventional pressures, i.e. atmospheric or above atmospheric pressures.

In the embodiment of Figure 1 the solid packing material lift portion of the apparatus was explained as using air or other gas for lifting purposes. However, liquid lifting media can be employed in a manner similar to that described in relation to the apparatus of Figure 2. When a liquid is used to lift the packing material according to Figure 1 the bottoms product has previously been stripped from the packing material and a fractionation apparatus will not be needed to separate the lifting medium from the bottoms product.

Such auxiliary equipment as pumps, valves, pressure indicating and control equipment, liquid and vapor flow indicating and control equipment and temperature indicating and control equipment are not shown nor described for purposes of simplicity. The need for the use of such equipment, its installation and operation are well known to those skilled in the art. Materials of construction for such apparatus as hereindescribed can in general be selected from among those commercially available taking into account the corrosive nature of materials in process and vacuum or pressure conditions maintained within the apparatus.

While certain embodiments of the invention have been described for illustrative purposes the invention is obviously not limited thereto.

I claim:

1. A method for continuously separating a mixture of organic materials capable of being vaporized without decomposition, comprising, maintaining a downward moving stream of nonadsorbing, thin-walled, hollow spheres in a vaporizing zone by adding cool nonadsorbing, thin-walled, metal spheres to the top portion and by removing said spheres from the bottom portion of said zone, adding heat to said metal spheres in the bottom portion of said zone, introducing said mixture of organic materials as feed into said zone at a level intermediate its ends, said ends of said zone being defined as the levels of introduction of said cool metal spheres and of addition of said heat, said feed being introduced at such a rate that unvaporized liquid therefrom moves downward at a rate only as fast as the rate of downward movement of said metal spheres, removing vaporized organic material from the top portion of said zone, condensing the removed material and recovering the entire condensate as one product of the process, removing said metal spheres wet with liquid organic material from the lower portion of said zone, removing said liquid material from the metal spheres removed from said zone, as another product, elevating and cooling the metal spheres of reduced residual material content as the aforesaid cool nonadsorbing, thin-walled metal spheres.

2. The method of claim 1 wherein the spheres are aluminum spheres.

3. A method for continuously separating a mixture of organic materials capable of being vaporized without decomposition, comprising, maintaining a downward moving stream of nonadsorbing, thin-walled hollow spheres in a vaporizing zone by adding cool nonadsorbing, thin-walled, metal spheres to the top portion and by removing said spheres from the bottom portion of said zone, adding heat to said metal spheres in the bottom portion of said zone, introducing said mixture of organic materials as feed into said zone at a level intermediate its ends, said ends of said zone being defined as the levels of introduction of said cool metal spheres and of addition of said heat, said feed being introduced at substantially its boiling point under the pressure existing in said zone at the level of feed introduction and at such a rate that the liquid portion of the feed only wets the surface of said spheres and moves downward therewith, removing vaporized organic material from the top portion of said zone, condensing the removed material and recovering the entire condensate as one product of the process, removing said metal spheres wet with liquid organic materials from the lower portion of said zone, removing said liquid material from the metal spheres removed from said zone as another product, elevating and cooling the metal spheres of reduced residual material content as the aforesaid cool nonadsorbing, thin-walled metal spheres.

4. The method of claim 3 wherein said pressure maintained in said treating zone is a superatmospheric pressure.

5. The method of claim 4 wherein the spheres are elevated in a fluid lift operation.

6. The method of claim 3 wherein the pressure maintained in said treating zone is a subatmospheric pressure.

7. The method of claim 6 wherein the spheres are elevated in a mechanical elevating operation.

8. A method for continuously separating a mixture of organic materials capable of being vaporized without decomposition, comprising, maintaining a downward moving stream of nonadsorbing, thin-walled, hollow metal spheres in a vaporizing zone by adding cool nonadsorbing, thin-walled, hollow metal spheres to the top portion of said zone and by removing said spheres from the bottom portion of said zone, adding heat to said spheres in the bottom portion of said zone, introducing said mixture as feed into said zone at a level intermediate its ends, said ends being defined as the levels of introduction of said cool spheres and of addition of said heat, said feed being introduced at such a rate that unvaporized liquid therefrom moves downward at a rate only as fast as the rate of downward movement of said spheres, removing vaporized organic material from the top portion of said zone, condensing the removed vaporized material and recovering the entire condensate as one product of the process, removing spheres and adhering liquid from the bottom portion of said zone and introducing same into a stripping zone, introducing steam into said stripping zone to remove said adhering liquid from said spheres, withdrawing steam and stripped organic material from said stripping zone, condensing this withdrawing material, dividing the condensed organic material into two portions, vaporizing one portion and introducing this vaporized portion into the bottom portion of said treating zone to supply said heat thereto, removing the remaining portion of said condensed organic material as a second product of the process, elevating stripped spheres from said stripping zone and cooling these stripped spheres to produce said cool spheres.

9. A method for continuously separating a mixture of organic materials capable of being vaporized without decomposition comprising, maintaining a downward moving stream of nonadsorbing, thin-walled, hollow metal spheres in a vaporizing zone by adding cool nonadsorbing, thin-walled, hollow metal spheres to the top portion of said zone, adding heat to said spheres in the bottom portion of said zone, introducing said mixture as feed into said zone at a level intermediate the ends, said feed being introduced in spray form at about its boiling point under the pressure existing in said treating zone at the level of feed introduction and at such a rate that the unvaporized liquid therefrom moves downward at a rate only as fast as the rate of downward movement of said spheres, said ends of said vaporizing zone being defined as the levels of introduction of said cool spheres and of said heat, removing vaporized organic material from the top portion of said zone, condensing removed material and recovering as one product the entire condensate, removing spheres and adhering liquid from the bottom portion of said zone and introducing same into a stripping zone, introducing steam into said stripping zone thereby stripping said adhering liquid from said spheres, condensing steam and stripped organic material, dividing this latter condensed organic material into two portions, vaporizing one portion and introducing this vaporized portion into the bottom portion of said vaporizing zone to supply said heat thereto, removing the other portion as a second product of the process, elevating and cooling the stripped spheres from said stripping zone to produce said cool spheres.

10. A method for continuously separating a mixture of organic materials capable of being separated without decomposition, comprising maintaining a downward moving stream of nonadsorbing, thin-walled, hollow spheres in a vaporizing zone by adding cool nonadsorbing, thin-walled, hollow spheres to the top portion of said zone, heating the spheres in the bottom portion of said zone, introducing said mixture as feed into said zone at a level intermediate its ends, said feed being introduced in spray form into said zone at about its boiling point under the pressure existing in said zone at the level of feed introduction, the ends of said zone being defined as the levels of introduction of said cool spheres and of addition of said heat, condensing a fraction of upward flowing vaporous organic material at a level intermediate the level of feed introduction and the top portion of said zone, removing this condensed material as one product of the process, removing vaporous material from the top portion of said zone, condensing this removed material and withdrawing the entire condensate as a second product, removing spheres with adhering liquid from the bottom portion of said zone, removing said adhering liquid from the removed spheres, elevating and cooling the spheres freed from said adhering liquid as the cool spheres added to the top portion of said zone, dividing the removed adhering liquid into two portions, removing one portion as a third product, vaporizing the other portion and introducing the vaporized portion into the bottom of said zone to supply heat for the aforementioned heating of said spheres in the bottom portion of said zone.

11. The method of claim 10 wherein the pressure maintained in said treating zone is a superatmospheric pressure.

12. The method of claim 10 wherein the pressure maintained in said treating zone is a subatmospheric pressure.

13. The method of claim 10 wherein said spheres are metal spheres.

14. A method for continuously separating a mixture of liquid organic materials capable of being vaporized without decomposition, comprising, maintaining a downward moving stream of nonadsorbent, thin-walled, metal spheres in a vaporizing zone by adding cool nonadsorbent, thin-walled, metal spheres to the top portion and by removing spheres from the bottom portion of said zone, adding heat to said spheres in the bottom portion of said zone, introducing said mixture as feed into said zone at a level intermediate its ends, said ends being defined as the levels of introduction of said cool spheres and of addition of heat to said spheres, removing vaporized organic material from the top portion of said zone, condensing the removed vaporized material and withdrawing the entire condensate as a product, said spheres removed from the bottom portion of said zone being wet with unvaporized liquid, all of said unvaporized liquid passing downward in said zone as a film of liquid on the surface of said spheres, removing said film of liquid from the spheres removed from said zone as a second product, elevating and cooling the spheres after removal of said film of liquid to produce said cool spheres added to the top portion of said zone.

15. A method for continuously separating a mixture of liquid organic materials capable of being vaporized without decomposition, comprising, maintaining a downward moving stream of packing in the form of nonadsorbent, thin-walled, metal spheres in a vaporizing zone by adding cool nonadsorbent, thin-walled, metal spheres to the top portion and by removing said spheres from the bottom portion of said zone, heating said spheres in the bottom portion of said zone by adding hot hydrocarbon vapors thereto, introducing said mixture as feed into said zone at a level intermediate its ends, said ends being defined as the levels of introduction of said cool spheres and of addition of said hot vapors, removing vaporized organic material from the top portion of said zone, condensing removed material and recovering the entire condensate as a product, said spheres being removed from the bottom portions of said zone being surface wet only with unvaporized liquid, removing said unvaporized liquid from the spheres removed from the bottom portion of said zone as a second product, elevating and cooling the spheres freed from surface wetting liquid as the above mentioned cool spheres.

16. A method for continuously separating a mixture of liquid organic materials capable of being vaporized without decomposition, comprising, maintaining a downward moving bed of nonadsorbent, thin-walled, metal spheres in a vaporizing zone by adding cool nonadsorbent, thin-walled, metal spheres to the top portion and removing said spheres from the bottom portion of said zone, heating said spheres in the bottom portion of said zone, introducing said mixture as feed into said zone at a level intermediate its ends, said ends being defined as the levels of introduction of said cool spheres to and addition of heat to said spheres in said zone, removing vaporized organic material from the top portion of said zone, condensing this removed material and recovering the entire condensate as a product, introducing hot inert vapor into the bottom portion of said zone as the above-mentioned heating said spheres, said spheres removed from the bottom portion of said zone being surface wet only with unvaporized organic liquid, removing the surface wetting organic liquid from the removed spheres as a second product, elevating and cooling the spheres free from said wetting organic liquid as the cool spheres added to the top portion of said zone.

17. A method for continuously separating a mixture of liquid organic materials capable of being vaporized without decomposition, comprising, maintaining a downward moving bed of nonadsorbent, thin-walled, metal spheres in a vaporizing zone by adding cool nonadsorbent, thin-walled, metal spheres to the top portion and by removing said spheres from the bottom portion of said zone, adding heat to the contents in the bottom portion of said zone, introducing said mixture as feed into said zone at a level intermediate its ends, the feed being introduced at such a rate that the liquid portion thereof only wets the surface of said spheres in said zone and said liquid portion thereon moves downward in said zone at the same rate as said spheres, said ends of said zone being defined as the levels of introduction of said cool spheres and of addition of said heat, removing vaporized material from the top portion of said zone, condensing this removed material and recovering the entire condensate as one product, said spheres removed from the bottom portion of said zone containing adhering liquid only on their surface, removing said adhering liquid, dividing the removed adhering liquid into two portions, vaporizing one portion and adding the so produced hot vapors to the bottom portion of said zone as the aforementioned heat added to the contents of the bottom portion of said zone, removing the second portion as another product, elevating and cooling the spheres freed of said adhering liquid as the aforementioned cool spheres.

18. A method for continuously separating a liquid mixture of organic materials capable of being vaporized without decomposition comprising, maintaining a downward moving bed of nonadsorbent, thin-walled, metal spheres in a vaporizing zone by adding cool nonadsorbent, thin-walled, metal spheres to the top portion and removing said spheres from the bottom portion of said zone adding heat to the contents in the bottom portion of said zone, introducing said mixture as feed into said zone at a level intermediate its ends and at such a rate that the liquid portion of said feed wets the surface only of said spheres and moves downward in said zone at the same rate as said spheres, said ends being defined as the levels of introduction of said cool spheres and of addition of said heat, removing vaporized organic material from the top portion of said zone, condensing the removed material and recovering the entire condensate as a product, said spheres removed from the bottom portion of said zone being wet only with a surface layer of liquid, removing surface liquid from the removed spheres, as a second product, elevating and cooling the spheres of reduced surface liquid content as the aforementioned cool spheres.

19. An apparatus for the distillation of distillable material under subatmospheric pressure comprising a fluid-tight vessel, means to introduce material to be distilled into said vessel, separate means to remove an overhead product and a bottoms product from said vessel, and means to maintain subatmospheric pressure in said vessel, a body of nonadsorptive, thin-walled, metal spheres in said vessel, means within said vessel to elevate said spheres from the bottom to the top of said vessel, means to cool said spheres in the top of said vessel, a heater to vaporize residual liquid from said spheres at a level near the bottom of said vessel, and a condenser intermediate said heater and the bottom of said vessel for condensing bottom product vapors.

20. An apparatus for the distillation of distillable material under subatmospheric pressure comprising a fluid-tight vessel, means to introduce material to be distilled into said vessel, separate means to remove an overhead product and a bottoms product from said vessel, and means to maintain subatmospheric pressure in said vessel, a body of nonadsorptive, thin-walled, metal spheres in said vessel, an elevator entirely within said vessel to elevate said spheres from the bottom to the top of said body of spheres, a cooler in the upper portion of said spheres to cool same, a heater to vaporize residual liquid from said spheres at a level near the bottom of said spheres, a perforate support for said spheres near the bottom of said vessel, and a condenser below and near said perforate support for condensing bottom product vapors.

21. A distillation apparatus comprising an upright vessel, means to introduce fluid to be distilled into said vessel, means to remove an overhead product from said vessel, a body of nonadsorptive, thin-walled, metal spheres in said vessel, a perforate support in the lower portion of said vessel for supporting said spheres, means for introduction of heat to said vessel in the lower portion of said spheres, means to withdraw spheres from said perforate support, and an elevator for elevating said spheres from the lower portion to the upper portion of said body of spheres.

22. In the distillation apparatus of claim 21, a second vessel disposed below said upright vessel, said means to withdraw said spheres being adapted to convey said spheres into the upper portion of said second vessel, a second perforate support in the lower portion of said second vessel for supporting said spheres, means to withdraw spheres from said second perforate support, means for introduction of steam into said second vessel below said second support, a second conduit for passage of steam and bottoms product vapors from the upper portion of said second vessel, a condenser in communication with said second conduit, means communicating with said condenser to vaporize condensate, the aforesaid means for introduction of heat to said upright vessel being in communication with said means to vaporize condensate for passage of vapors therefrom to the first mentioned vessel, said elevator comprising a gas-lift elevator exterior of said vessels, said elevator being in operative communication with said means to withdraw said spheres from said second perforate support, means for separating gas lift gas from lifted spheres at the upper end of said gas-lift elevator, a conduit for flow of spheres from said elevator to the top level of said body of spheres in the first mentioned vessel.

23. In the distillation apparatus of claim 21 said elevator being a liquid-lift elevator exterior of said vessel and comprising a second conduit communicating with said means to withdraw spheres from said perforate support, a source of spheres lifting liquid in communication with the lower portion of said second conduit, a second vessel in communication with the upper end of said second conduit for receiving lifted spheres, means for separating lifted spheres from lifting liquid in said second vessel and a second conduit for flow of said spheres from said second vessel to the upper portion of said body of spheres in said upright vessel.

(References on following page)

References Cited in the file of this patent

UNITED STATES PATENTS

| | | |
|---|---|---|
| 949,954 | Bedford | Feb. 22, 1910 |
| 1,450,327 | Meischke | Apr. 3, 1923 |
| 1,614,387 | Pereda | Jan. 11, 1927 |
| 1,699,989 | Pyzel | Jan. 22, 1929 |
| 2,580,635 | Winters | Jan. 1, 1952 |
| 2,684,933 | Findlay | July 27, 1954 |
| 2,701,786 | Evans et al. | Feb. 8, 1955 |
| 2,758,073 | Krebs et al. | Aug. 7, 1956 |

FOREIGN PATENTS

| | | |
|---|---|---|
| 1,119 | Great Britain | Dec. 21, 1852 |
| 1,623 | Great Britain | June 14, 1866 |